United States Patent
Shimokawa et al.

(10) Patent No.: US 12,304,998 B2
(45) Date of Patent: May 20, 2025

(54) POLYCARBONATE RESIN

(71) Applicant: MITSUBISHI GAS CHEMICAL COMPANY, INC., Tokyo (JP)

(72) Inventors: Keisuke Shimokawa, Tokyo (JP); Hidefumi Harada, Tokyo (JP); Takehiko Isobe, Tokyo (JP); Jungo Taguchi, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 656 days.

(21) Appl. No.: 17/628,723

(22) PCT Filed: Jul. 27, 2020

(86) PCT No.: PCT/JP2020/028657
§ 371 (c)(1),
(2) Date: Jan. 20, 2022

(87) PCT Pub. No.: WO2021/024832
PCT Pub. Date: Feb. 11, 2021

(65) Prior Publication Data
US 2022/0259373 A1   Aug. 18, 2022

(30) Foreign Application Priority Data

Aug. 2, 2019 (JP) ................................ 2019-143038
Nov. 13, 2019 (JP) ................................ 2019-205131

(51) Int. Cl.
*C08G 64/16* (2006.01)
*C08L 69/00* (2006.01)

(52) U.S. Cl.
CPC .......... *C08G 64/1691* (2013.01); *C08L 69/00* (2013.01); *C08L 2201/02* (2013.01); *C08L 2201/08* (2013.01)

(58) Field of Classification Search
CPC .... C08G 64/1691; C08G 63/00; C08G 64/00; C08G 64/04; C08L 2201/02; C08L 2201/08; C08L 69/00; C08L 101/00; C08K 5/42
See application file for complete search history.

(56) References Cited

U.S. PATENT DOCUMENTS

| | | | |
|---|---|---|---|
| 3,321,440 A | 5/1967 | Lee | |
| 3,484,411 A | 12/1969 | Markus | |
| 2020/0115496 A1 | 4/2020 | Shibasaki et al. | |

FOREIGN PATENT DOCUMENTS

| | | |
|---|---|---|
| JP | 2014-051538 A | 3/2014 |
| JP | 2018-199745 A | 12/2018 |
| JP | 2018-199746 A | 12/2018 |
| KR | 10-2015-0003653 A | 1/2015 |
| WO | 90/12342 A1 | 10/1990 |
| WO | 2010/086385 A1 | 8/2010 |
| WO | 2011/131366 A1 | 10/2011 |

OTHER PUBLICATIONS

Kühling et al. (Macromolecules 1990, 23, 4192-4195).*
International Search Report and Written Opinion of the International Searching Authority issued in International Application No. PCT/JP2020/028657, dated Oct. 13, 2020, along with an English translation thereof.
Office Action dated Aug. 6, 2024, in family member Japanese patent application No. 2021-537232 and English language translation thereof.
Extended European Search Report issued in the corresponding European Patent Application No. 20851087.5 dated Aug. 26, 2022.
Quinn C. B. "The Flammability Properties of Copolyesters and Copolycarbonates Containing Acetylenes", Journal of Polymer Science: Polymer Chemistry Edition vol. 15, 2587-2594 (1977).

* cited by examiner

Primary Examiner — Shane Fang
(74) Attorney, Agent, or Firm — GREENBLUM & BERNSTEIN P.L.C.

(57) ABSTRACT

Provided is a polycarbonate resin having a structural unit (I) represented by formula (1) below:

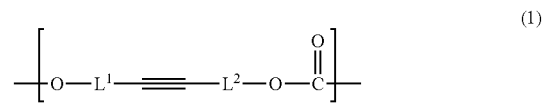

wherein $L^1$ and $L^2$ each independently represent a divalent linking group selected from an alkylene group, a cycloalkylene group, an arylene group, an oxyalkylene group, an oxyarylene group, and a group formed by combining two or more of these, where one or more hydrogen atoms of the linking group are optionally further replaced with substituents, and two of the substituents are optionally bonded to each other to form a ring structure.

9 Claims, No Drawings

POLYCARBONATE RESIN

TECHNICAL FIELD

The present invention relates to a polycarbonate resin, a polycarbonate resin composition containing the resin, a formed article obtained by forming the resin composition, and a method for producing the polycarbonate resin.

BACKGROUND ART

Polycarbonate resins are resins having excellent properties such as heat resistance, mechanical properties, and electrical properties and are widely used, for example, for automotive materials, electrical and electronic equipment materials, various household electrical equipment materials, housing materials, and other materials for producing parts or the like in the industrial field. In particular, flame-retarded polycarbonate resins are suitably used as members for OA/information equipment or the like such as computers, notebook personal computers, mobile phones, printers, and copiers.

Conventionally, halogen-based flame retardants or phosphorus flame retardants have been mixed with a polycarbonate resin composition containing a polycarbonate resin to impart flame retardancy to a formed article.

However, polycarbonate resin compositions containing halogen flame retardants having chlorine or bromine may have adverse effects such as the reduction of thermostability and the corrosion of screws and molding dies of molding machines in forming. Further, since polycarbonate resin compositions containing phosphorus flame retardants may hinder high transparency, which is one of the characteristics of polycarbonate resins, or reduce the impact resistance or the heat resistance, the use thereof may have been limited.

In addition, formed articles using halogen-based flame retardants and phosphorus flame retardants may possibly cause environmental pollution when the products are disposed of or collected. Therefore, it has been desired in recent years to achieve flame retardancy without using such flame retardants.

In response to such a demand, Patent Literature 1 discloses, as a polycarbonate resin composition having excellent flame retardancy and excellent heat resistance, a polycarbonate resin composition which comprises: a polycarbonate resin having a specific terminal structure and a viscosity-average molecular weight adjusted to a predetermined range; and a stabilizer, for example.

CITATION LIST

Patent Literature

[Patent Literature 1] Japanese Patent Laid-Open No. 2018-199745

SUMMARY OF INVENTION

Technical Problem

Meanwhile, the demand for flame retardancy of formed article materials is high, and the polycarbonate resin composition disclosed in Patent Literature 1 has room for further improvement in flame retardancy.

Therefore, a new polycarbonate resin having better flame retardancy is desired.

Solution to Problem

The present invention provides a polycarbonate resin having a specific structural unit, more specifically, the polycarbonate resin, the polycarbonate resin composition, the formed article, and the method for producing the polycarbonate resin according to the following embodiments [1] to [11].

[1] A polycarbonate resin having a structural unit (I) represented by formula (1) below:

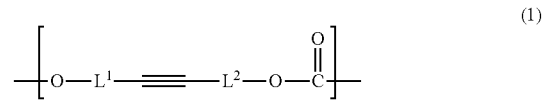

wherein $L^1$ and $L^2$ each independently represent a divalent linking group selected from an alkylene group, an oxyalkylene group, a cycloalkylene group, an arylene group, an oxyarylene group, and a group formed by combining two or more of these, where one or more hydrogen atoms of the linking group are optionally further replaced with substituents, and two of the substituents are optionally bonded to each other to form a ring structure.

[2] The polycarbonate resin according to [1] above, wherein $L^1$ is a divalent linking group represented by formula (i) below, and $L^2$ is a divalent linking group represented by formula (ii) below:

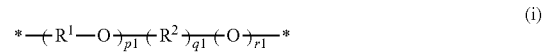

wherein the symbol * represents a bonding position, $R^1$ and $R^2$ each independently represent an alkylene group having 1 to 20 carbon atoms, a cycloalkylene group having 3 to 20 ring-forming carbon atoms, an arylene group having 6 to 20 ring-forming carbon atoms, where one or more hydrogen atoms of these groups are optionally further replaced with substituents, and two of the substituents are optionally bonded to each other to form a ring structure, and p1, q1, p2, and q2 are each independently an integer of 0 to 10, and r1 and r2 are each independently 0 or 1, provided that p1+q1 is an integer of 1 or more and p2+q2 is an integer of 1 or more.

[3] The polycarbonate resin according to [1] or [2] above, wherein $L^1$ is a divalent linking group represented by any of formulas (i-1) to (i-4) below, and $L^2$ is a divalent linking group represented by any of formulas (ii-1) to (ii-4) below:

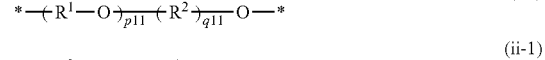

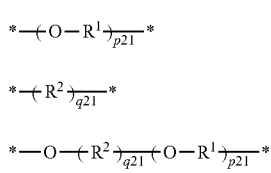

(ii-2)

(ii-3)

(ii-4)

wherein the symbol * represents a bonding position, $R^1$ and $R^2$ each independently represent an alkylene group having 1 to 20 carbon atoms, a cycloalkylene group having 3 to 20 ring-forming carbon atoms, an arylene group having 6 to 20 ring-forming carbon atoms, where one or more hydrogen atoms of these groups are optionally further replaced with substituents, and two of the substituents are optionally bonded to each other to form a ring structure, and p11, q11, p21, and q21 are each independently an integer of 1 to 10.

[4] The polycarbonate resin according to any one of [1] to [3] above, further comprising a structural unit (II) represented by formula (2) below:

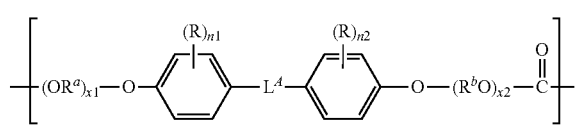

(2)

wherein $R^a$ and $R^b$ each independently represent an alkylene group having 1 to 8 carbon atoms, Rs each independently represent an alkyl group having 1 to 8 carbon atoms or an aryl group having 6 to 12 ring-forming carbon atoms, x1 and x2 are each independently an integer of 0 to 10, n1 and n2 are each independently an integer of 0 to 4, and $L^A$ is a single bond or a linking group represented by any of formulas (a) to (g) below:

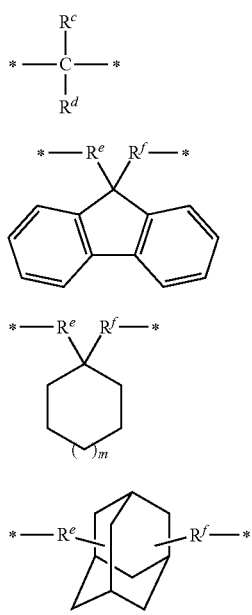

(a)

(b)

(c)

(d)

(e)

(f)

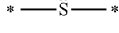

(g)

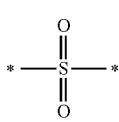

wherein the symbol * represents a bonding position, $R^c$ and $R^d$ each independently represent a hydrogen atom, an alkyl group having 1 to 8 carbon atoms, or an aryl group having 6 to 12 carbon atoms, $R^e$ and $R^f$ each independently represent a single bond or an alkylene group having 1 to 4 carbon atoms, and m is an integer of 1 to 10.

[5] The polycarbonate resin according to [4] above, having a content ratio [(I)/(II)] of the structural unit (I) to the structural unit (II) of 0.01/99.99 to 99.99/0.01 by molar ratio.

[6] The polycarbonate resin according to any one of [1] to [5] above, having a weight-average molecular weight (Mw) of 10,000 to 70,000.

[7] The polycarbonate resin according to any one of [1] to [6] above, having a glass transition temperature (Tg) of 100 to 160° C.

[8] A polycarbonate resin composition comprising the polycarbonate resin according to any one of [1] to [7] above.

[9] The polycarbonate resin composition according to [8] above, being evaluated to be V-2 or higher in a combustibility test conducted on the polycarbonate resin composition according to the UL94 standard.

[10] A formed article obtained by forming the polycarbonate resin composition according to [8] or [9] above.

[11] A method for producing the polycarbonate resin according to any one of [1] to [7] above, comprising a step of carrying out a transesterification reaction.

Advantageous Effects of Invention

The polycarbonate resin according to a preferred embodiment of the present invention has better flame retardancy. According to a more preferred embodiment, it can serve as a material for forming a formed article having a short flame burning time.

DESCRIPTION OF EMBODIMENTS

[Polycarbonate Resin]

The polycarbonate resin of the present invention has a structural unit (I) represented by formula (1) below.

(1)

It is considered that the polycarbonate resin of the present invention can have further improved flame retardancy due a structure having the structural unit (I) containing a triple bond in the main chain, as shown in formula (1) above, particularly, can exert a special effect of reducing the flame burning time.

Unless otherwise specified, the following embodiments of the polycarbonate resin refer to preferred embodiments for improving the flame retardancy, particularly, improving the effect of reducing the flame burning time.

In formula (I) above, $L^1$ and $L^2$ each independently represent a divalent linking group selected from an alkylene group, an oxyalkylene group, a cycloalkylene group, an arylene group, an oxyarylene group, and a group formed by combining two or more of these, where one or more hydrogen atoms of the linking group are optionally further replaced with substituents, and two of the substituents are optionally bonded to each other to form a ring structure.

The preferred number of carbon atoms of each linking group in the following definition does not include the number of carbon atoms of the substituents optionally contained in the linking group.

Examples of the alkylene group include a methylene group (—$CH_2$—), an ethylene group (—$CH_2CH_2$—), an ethylidene group (—$CH(CH_3)$—), a trimethylene group (—$CH_2CH_2CH_2$—), a propylene group (—$CH(CH_3)$ $CH_2$—), a propylidene group (—$CHCH_2$ ($CH_3$)—), an isopropylidene group (—$C(CH_3)_2$—), a tetramethylene group (—$CH_2CH_2CH_2CH_2$—), a 1-methyltrimethylene group (—$CH(CH_3)CH_2CH_2$—), a 2-methyl trimethylene group (—$CH_2CH(CH_3)CH_2$—), a butylene group (—$C(CH_3)_2CH_2$—), and a group represented by —$(CH_2)_n$— (where n is an integer of 1 or more, preferably, an integer of 1 to 20).

The alkylene group may be a linear alkylene group or a branched alkylene group.

Further, the alkylene group preferably has 1 to 20, more preferably 1 to 10, further preferably 1 to 5, furthermore preferably 1 to 3, particularly preferably 2 carbon atoms.

Examples of the oxyalkylene group include a group in which an oxygen atom is bonded to one end of the connecting part of the alkylene group, and the preferred ranges of the number of carbon atoms are also as described above.

Examples of the cycloalkylene group include a cyclopropylene group, a cyclobutylene group, a cyclopentylene group, a cyclohexylene group, a cycloheptylene group, a cyclooctylene group, a cyclononylene group, a cyclodecylene group, a norbornylene group, an adamantylene group, and a decahydronaphthalenylene group.

The cycloalkylene group preferably has 3 to 20, more preferably 5 to 15, further preferably 5 to 10 ring-forming carbon atoms.

Examples of the arylene group include a phenylene group, a naphthylene group, a biphenylene group, and a terphenylene group.

The arylene group preferably has 6 to 20, more preferably 6 to 18, further preferably 6 to 12, furthermore preferably 6 to 10, particularly preferably 6 ring-forming carbon atoms.

Examples of the oxyarylene group include a group in which an oxygen atom is bonded to one end of the connecting part of the arylene group, and the preferred ranges of the number of ring-forming carbon atoms are also the same.

Here, one or more hydrogen atoms of these linking groups are optionally further replaced with substituents.

Examples of such a substituent include an alkyl group having 1 to 20 (preferably 1 to 10, more preferably 1 to 5, further preferably 1 to 3) carbon atoms, an alkoxy group having 1 to 20 (preferably 1 to 10, more preferably 1 to 5, further preferably 1 to 3) carbon atoms, a thioalkyl group having 1 to 20 (preferably 1 to 10, more preferably 1 to 5, further preferably 1 to 3) carbon atoms, a cycloalkyl group having 3 to 20 (preferably 5 to 15, more preferably 5 to 10) ring-forming carbon atoms, a dialkylamino group having an alkyl group having 1 to 20 (preferably 1 to 10, more preferably 1 to 5, further preferably 1 to 3) carbon atoms, an amino group, an aryl group having 6 to 20 (preferably 6 to 18, more preferably 6 to 12, further preferably 6 to 10, furthermore preferably 6) ring-forming atoms, a heteroaryl group having 3 to 20 (preferably 5 to 16) ring-forming atoms, a hydroxy group, a cyano group, and a halogen atom.

These substituents are optionally substituted with still other substituents described above.

Among these, the substituent capable of substituting the linking group is preferably a substituent selected from the alkyl group, the alkoxy group, the diarylamino group, the amino group, the aryl group, the heteroaryl group, and the hydroxy group, more preferably a substituent selected from the alkyl group and the aryl group, further preferably the alkyl group.

In one embodiment of the present invention, two of the substituents may be bonded to each other to form a ring structure. The ring structure can be heterocyclic, when one of the two substituents bonded to each other contains a heteroatom such as N (nitrogen atom), O (oxygen atom), and S (sulfur atom).

Examples of the linking group with such a ring structure formed include divalent groups represented by formulas (p-1) to (p-3) below.

(p-1)

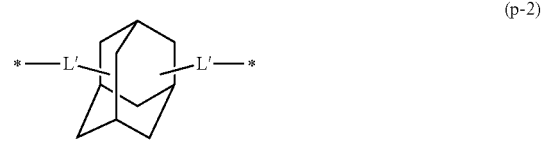

(p-2)

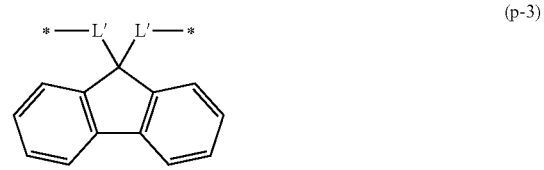

(p-3)

In formulas (p-1) to (p-3) above, the symbol * represents a bonding position, and n is an integer of 1 or more, preferably an integer of 1 to 10.

L's each independently represent a single bond or a divalent linking group, and examples of the linking group include an alkylene group, an oxyalkylene group, a cycloalkylene group, an arylene group, and an oxyarylene group, specifically, those which can be selected as $L_1$ and $L^2$ above.

However, it is preferred that L's each independently represent a single bond, an alkylene group having 1 to 5 (preferably 1 to 3, more preferably 1 to 2, further preferably 1) carbon atoms, or an arylene group having 6 to 10 (preferably 6) ring-forming carbon atoms.

Further, $L^1$ and $L^2$ in formula (1) above each may be a group formed by combining two or more of these, that is, a divalent linking group formed by combining two or more selected from an alkylene group, an oxyalkylene group, a cycloalkylene group, an arylene group, and an oxyarylene group.

In such an embodiment, it is preferred that $L^1$ be a divalent linking group represented by formula (i) below, and $L^2$ be a divalent linking group represented by formula (ii) below.

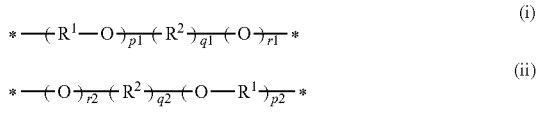

In formulas (i) and (ii) above, the symbol * represents a bonding position.

$R^1$ and $R^2$ each independently represent an alkylene group having 1 to 20 carbon atoms, a cycloalkylene group having 3 to 20 ring-forming carbon atoms, or an arylene group having 6 to 20 ring-forming carbon atoms, where one or more hydrogen atoms of these groups are optionally further replaced with substituents, and two of the substituents are optionally bonded to each other to form a ring structure.

The alkylene group, the cycloalkylene group, and the arylene group which can be selected as $R^1$ and $R^2$ are the same as the alkylene group, the cycloalkylene group, and the arylene group which can be selected as $L^1$ and $L^2$ above, and the preferred ranges of the number of carbon atoms are also the same.

Further, the substituents optionally contained in these groups are also the same as the substituents described above, and the preferred embodiments are also the same as above.

In one embodiment of the present invention, $R^1$ and $R^2$ preferably each independently represent an alkylene group having 1 to 20 carbon atoms and optionally having a substituent or an arylene group having 6 to 20 ring-forming carbon atoms and optionally having a substituent, more preferably an alkylene group having 1 to 20 carbon atoms and optionally having a substituent, further preferably an alkylene group having 1 to 20 carbon atoms and having no substituents.

The preferred ranges of the number of carbon atoms in the alkylene group and the arylene group and the substituents optionally contained in the alkylene group and the arylene group are as described above.

In formulas (i) and (ii) above, p1, q1, p2, and q2 are each independently an integer of 0 to 10, and r1 and r2 are each independently 0 or 1.

The values of p1+q1 are each independently an integer of 1 or more, preferably an integer of 1 to 10, more preferably an integer of 1 to 5, further preferably an integer of 1 to 3, furthermore preferably 1.

Further, the values of p2+q2 are each independently an integer of 1 or more, preferably an integer of 1 to 10, more preferably an integer of 1 to 5, further preferably an integer of 1 to 3, furthermore preferably 1.

In one embodiment of the present invention, $L^1$ and $L^2$ may be the same linking group or may be heterogeneous linking groups. For example, when $L^1$ is a methylene group and $L^2$ is an ethylene group, both are "alkylene groups" and thus are "the same linking group". Examples of the combination of "the same linking group" include a combination in which $L^1$ and $L^2$ are both alkylene groups, $L^1$ and $L^2$ are both oxyalkylene groups, $L^1$ and $L^2$ are both cycloalkylene groups, $L^1$ and $L^2$ are both arylene groups, or $L^1$ and $L^2$ are both oxyalkylene groups.

Meanwhile, for example, when $L^1$ is a methylene group (an alkylene group) and $L^2$ is a phenylene group (an arylene group), they are "heterogeneous linking groups".

According to a more preferred embodiment of the present invention, it is more preferred that $L^1$ be a divalent linking group represented by any of formulas (i-1) to (i-4) below, and $L^2$ be a divalent linking group represented by any of formulas (ii-1) to (ii-4) below.

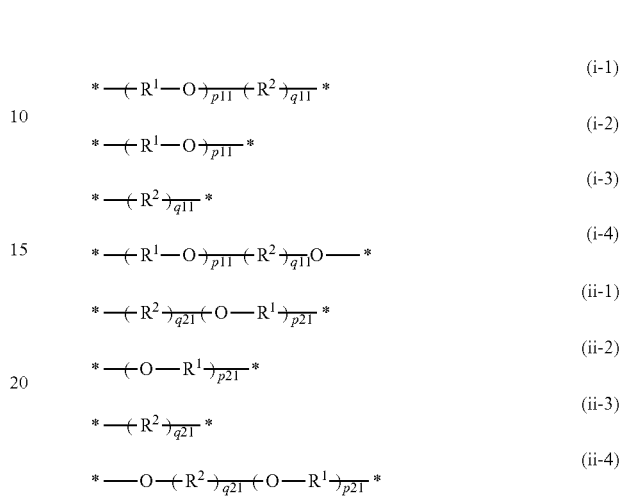

In formulas (i-1) to (i-4) and (ii-1) to (ii-4) above, the symbol * represents a bonding position.

$R^1$ and $R^2$ are the same as defined in formulas (i) and (ii) above, and the preferred embodiments are also the same.

Further, p11, q11, p21, and q21 are each independently an integer of 1 to 10, preferably an integer of 1 to 5, more preferably an integer of 1 to 3, further preferably 1 or 2, furthermore preferably 1.

In one embodiment of the present invention, $L^1$ may be a divalent linking group represented by formula (i-1) above, and $L^2$ may be a divalent linking group represented by formula (ii-1) above;

$L^1$ may be a divalent linking group represented by formula (i-2) above, and $L^2$ may be a divalent linking group represented by formula (ii-2) above;

$L^1$ may be a divalent linking group represented by formula (i-3) above, and $L^2$ may be a divalent linking group represented by formula (ii-3) above; or $L^1$ may be a divalent linking group represented by formula (i-4) above, and $L^2$ may be a divalent linking group represented by formula (ii-4) above.

In one embodiment of the present invention, it is more preferred that $L^1$ be a divalent linking group represented by formula (i-1) or (i-3) above and $L^2$ be a divalent linking group represented by formula (ii-1) or (ii-3) above, it is further preferred that $L^1$ be a divalent linking group represented by formula (i-1) above and $L^2$ be a divalent linking group represented by formula (ii-1) above, or $L^1$ be a divalent linking group represented by formula (i-3) above and $L^2$ be a divalent linking group represented by formula (ii-3) above, and it is furthermore preferred that $L^1$ be a divalent linking group represented by formula (i-1) above and $L^2$ be a divalent linking group represented by formula (ii-1) above.

Further, it is preferred that the polycarbonate resin of the present invention further have a structural unit (II) represented by formula (2) below.

(2)

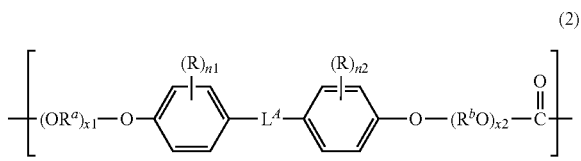

In formula (2) above, $R^a$ and $R^b$ each independently represent an alkylene group having 1 to 8 (preferably 1 to 5, more preferably 2 to 3, further preferably 2) carbon atoms.

Examples of the alkylene group include the same alkylene group having 1 to 8 carbon atoms which can be selected as $L^1$ and $L^2$ in formula (1) above.

It should be noted that x1 and x2 are each independently an integer of 0 to 10, preferably an integer of 0 to 5, more preferably an integer of 0 to 2, further preferably 0.

In formula (2) above, Rs each independently represent an alkyl group having 1 to 8 (preferably 1 to 5, more preferably 1 to 3, further preferably 1) carbon atoms or an aryl group having 6 to 12 (preferably 6 to 10, more preferably 6) ring-forming carbon atoms.

Examples of the alkyl group include a methyl group, an ethyl group, a n-propyl group, an isopropyl group, a n-butyl group, an isobutyl group, a s-butyl group, a t-butyl group, a n-pentyl group, a n-hexyl group, a n-heptyl group, a n-octyl group, and a 2-ethylhexyl group. The alkyl group may be a linear alkyl group or a branched alkyl group.

Further, examples of the aryl group include a phenyl group, a biphenyl group, a tarphenyl group, and a naphthyl group.

It should be noted that n1 and n2 are each independently an integer of 0 to 4, preferably 0 to 2, more preferably 0 to 1, further preferably 0.

In formula (2) above, $L^A$ is a single bond or a linking group represented by any of formulas (a) to (g) below.

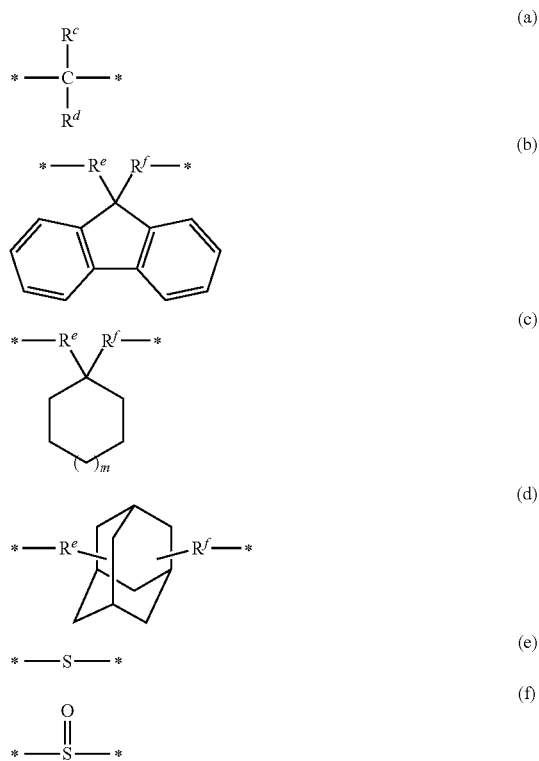

In formulas (a) to (g) above, the symbol * represents a bonding position.

Further, $R^c$ and $R^d$ in formula (a) each independently represent a hydrogen atom, an alkyl group having 1 to 8 (preferably 1 to 5, more preferably 1 to 3, further preferably 1) carbon atoms, or an aryl group having 6 to 12 (preferably 6 to 10, more preferably 6) carbon atoms.

Examples of the alkyl group and the aryl group include the same alkyl group or the same aryl group which can be selected as R in formula (2) above.

$R^e$ and $R^f$ in formulas (b) to (d) each independently represent a single bond or an alkylene group having 1 to 4 (preferably 1 to 2, more preferably 1) carbon atoms.

Examples of the alkylene group include the same alkylene group having 1 to 4 carbon atoms which can be selected as $L^1$ and $L^2$ in formula (1) above.

In formula (c), m is an integer of 1 to 10, preferably 1 to 5, more preferably 1 to 3, further preferably 1.

In one embodiment of the present invention, $L^A$ in formula (2) is preferably a linking group represented by any of formulas (a) to (d) above.

In particular, when x1 and x2 in formula (2) are 0, $L^A$ is preferably a linking group represented by formula (a), formula (c), or formula (d) above, more preferably a linking group represented by formula (a) above, further preferably a linking group which is represented by formula (a) above and in which $R^c$ and $R^d$ are each a methyl group.

When x1 and x2 in formula (2) is not 0, $L^A$ is preferably a linking group represented by formula (b) above.

In the polycarbonate resin according to one embodiment of the present invention, the content of the structural unit (I) is preferably 0.01 mol % or more, more preferably 0.1 mol % or more, further preferably 1.0 mol % or more, furthermore preferably 2.0 mol % or more, particularly preferably 2.5 mol % or more, and is preferably 50 mol % or less, more preferably 30 mol % or less, further preferably 20 mol % or less, furthermore preferably 10 mol % or less, particularly preferably 5 mol % or less, based on the total amount (100 mol %) of structural units of the polycarbonate resin.

In the polycarbonate resin according to one embodiment of the present invention, the content of the structural unit (II) is preferably 50 mol % or more, more preferably 70 mol % or more, further preferably 80 mol % or more, furthermore preferably 90 mol % or more, particularly preferably 95 mol % or more, and is preferably 99.99 mol % or less, more preferably 99.9 mol % or less, further preferably 99.0 mol % or less, furthermore preferably 98.0 mol % or less, particularly preferably 97.5 mol % or less, based on the total amount (100 mol %) of structural units of the polycarbonate resin.

The polycarbonate resin according to one embodiment of the present invention may contain structural units other than the structural unit (I) and the structural unit (II).

However, the total content of the structural unit (I) and the structural unit (II) is preferably 70 to 100 mol %, more preferably 80 to 100 mol %, further preferably 90 to 100 mol %, furthermore preferably 95 to 100 mol %, particularly preferably 100 mol %, based on the total amount (100 mol %) of structural units of the polycarbonate resin.

The polycarbonate resin according to one embodiment of the present invention has a content ratio [(I)/(II)] of the structural unit (I) to the structural unit (II) of preferably 0.01/99.99 to 99.99/0.01, more preferably 0.05/99.95 to 50/50, further preferably 0.1/99.9 to 20/80, further preferably 0.2/99.8 to 10/90, furthermore preferably 0.3/99.7 to 7.5/92.5, particularly preferably 0.5/99.5 to 5.0/95.0, by molar ratio.

According to one embodiment, the polycarbonate resin of the present invention has a weight-average molecular weight (Mw) of preferably 10,000 to 70,000, more preferably 15,000 to 60,000, further preferably 18,000 to 50,000, furthermore preferably 20,000 to 40,000.

According to one embodiment, the polycarbonate resin of the present invention has a molecular weight distribution (Mw/Mn) of preferably 5.0 or less, more preferably 3.5 or less, further preferably 3.0 or less, furthermore preferably 2.5 or less, particularly preferably 2.1 or less.

In this description, the weight-average molecular weight (Mw) and the number-average molecular weight (Mn) are values measured by gel permeation chromatography (GPC) in terms of standard polystyrene, specifically, values measured by the methods described in Examples.

Further, the molecular weight distribution is a ratio [Mw/Mn] of the weight-average molecular weight (Mw) to the number-average molecular weight (Mn).

According to one embodiment, the glass transition temperature (Tg) of the polycarbonate resin of the present invention is preferably 100 to 160° C., more preferably 110 to 150° C., further preferably 115 to 145° C., furthermore preferably 120 to 140° C.

In this description, the glass transition temperature (Tg) is a value measured using a differential thermal scanning calorimeter (DSC), specifically, a value measured by the method described in Examples.

In the polycarbonate resin according to one embodiment of the present invention, the pyrolysis temperature corresponding to the decrease in mass preferably falls within the following ranges.

Pyrolysis temperature when the mass decreases by 1% of preferably 200° C. or more, more preferably 250° C. or more, further preferably 300° C. or more, furthermore preferably 320° C. or more.

Pyrolysis temperature when the mass decreases by 3% of preferably 230° C. or more, more preferably 280° C. or more, further preferably 330° C. or more, furthermore preferably 350° C. or more.

Pyrolysis temperature when the mass decreases by 5% of preferably 250° C. or more, more preferably 300° C. or more, further preferably 350° C. or more, furthermore preferably 380° C. or more.

Pyrolysis temperature when the mass decreases by 10% of preferably 300° C. or more, more preferably 350° C. or more, further preferably 400° C. or more, furthermore preferably 420° C. or more.

In this description, the pyrolysis temperature is a value measured using a simultaneous thermogravimetric analyzer (TG/TDA), specifically, a value measured by the method described in Examples.

[Method for Producing Polycarbonate Resin]

The method for producing the polycarbonate resin of the present invention is not particularly limited but is preferably a method including a step of carrying out a transesterification reaction. In this step, the aforementioned polycarbonate resin is obtained by a transesterification reaction between a diol component which is a raw material monomer and a diester carbonate.

Examples of the diol component which is a raw material monomer include at least a compound (Ia) represented by formula (1a) below and preferably further include a compound (IIa) represented by formula (2a) below.

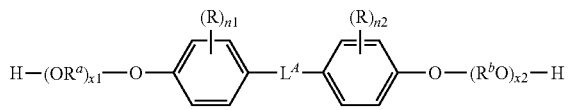

In formula (1a) above, $L^1$ and $L^2$ are as defined in formula (1) above, and the preferred embodiments are also as described above.

In formula (2a) above, $R^a$, $R^b$, R, x1, x2, n1, n2, and $L^A$ are as defined in formula (2) above, and the preferred embodiments are also as described above.

The compound (Ia) serves as a part of the structure of the structural unit (I), and the compound (IIa) serves as a part of the structure of the structural unit (II).

In one embodiment of the present invention, a diol compound other than the compounds (Ia) and (IIa) may be used as the diol component as a raw material monomer.

However, the total content of the compound (Ia) and the compound (IIa) is preferably 70 to 100 mol %, more preferably 80 to 100 mol %, further preferably 90 to 100 mol %, furthermore preferably 95 to 100 mol %, particularly preferably 100 mol %, based on the total amount (100 mol %) of the diol component as a raw material monomer.

In one embodiment of the present invention, the ratio [(Ia)/(IIa)] of the amount to be mixed of the compound (Ia) to the compound (IIa) is preferably 0.01/99.99 to 99.99/0.01, more preferably 0.05/99.95 to 50/50, further preferably 0.1/99.9 to 20/80, further preferably 0.2/99.8 to 10/90, furthermore preferably 0.3/99.7 to 7.5/92.5, particularly preferably 0.5/99.5 to 5.0/95.0, by molar ratio.

Examples of the diester carbonate include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate. Among these, diphenyl carbonate is preferred in view of reactivity and purity.

One of these diester carbonates may be used alone, or two or more of them may be used in combination.

The amount of diester carbonates to be mixed is preferably 1.01 to 1.30 mol, more preferably 1.01 to 1.20 mol, further preferably 1.01 to 1.10 mol, per mole of the diol component.

In the transesterification reaction, a transesterification catalyst is preferably used.

Examples of the transesterification catalyst include organic acid salts, carbonates, oxides, hydroxides, hydrides, and alkoxides of a metal selected from alkali metals and alkaline earth metals, zinc acetate, zinc benzoate, zinc 2-ethylhexanoate, tin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate, lead (IV) acetate, zirconium acetate, and titanium tetrabutoxide.

One of these transesterification catalysts may be used alone, or two or more of them may be used in combination.

The amount of the transesterification catalysts to be used is preferably $1\times10^{-9}$ to $1\times10^{-3}$ mol, more preferably $1\times10^{-7}$ to $1\times10^{-4}$ mol, per mole of the diol component.

As specific reaction conditions for the transesterification reaction, it is preferred to carry out the reaction at a reaction temperature of 120 to 260° C. (preferably 180 to 260° C.) for a reaction time of 0.1 to 5 hours (preferably 0.5 to 3 hours).

Then, it is preferred to carry out a reaction between the diol compound and another monomer, while increasing the degree of decompression in the reaction system and the reaction temperature, and to finally carry out a polycondensation reaction at a reduced pressure of 1 mmHg or less and a temperature of 200 to 350° C. for 0.05 to 2 hours.

Such reactions may be performed in a continuous manner or in a batch manner.

The reactor to be used for the aforementioned reactions may be a vertical reactor equipped with anchor-type stirring blades, max blend stirring blades, helical ribbon-type stirring blades, or the like, may be a horizontal reactor equipped with paddle blades, lattice blades, spectacle-shaped blades, or the like, or may be an extruder-type reactor equipped with screws. Further, a reactor appropriately combining these reactors in consideration of viscosity of polymers is preferably used.

In the method for producing a polycarbonate resin according to one embodiment of the present invention, catalysts may be removed or inactivated after the completion of polymerization reactions for maintaining the thermostability and the hydrolytic stability.

Further, a step of devolatizing and removing compounds having a low boiling point in the resin at a pressure of 0.1 to 1 mmHg and a temperature of 200 to 350° C. may be provided after inactivating the catalysts. In this step, a horizontal device equipped with stirring blades having excellent surface renewal performance such as paddle blades, lattice blades, and spectacle-shaped blades, or a thin film evaporator is preferably used.

Since the resin thus obtained is desired to contain foreign matter as little as possible, molten raw materials may be filtered or catalyst solutions may be filtered. The mesh of the filter to be used for filtration is preferably 5 µm or less, more preferably 1 µm or less.

The polycarbonate resin obtained in this step may be in the form of flakes and may be prepared into a polycarbonate resin composition.

After being isolated according to a known method, as required, the polycarbonate resin may be formed into pellets of a polycarbonate resin composition, for example, by known methods such as strand cold cutting (a method of forming the polycarbonate resin composition once molten into the form of strands, followed by cooling, and cutting it into a predetermined shape for pelletization), in-air hot cutting (a method of cutting the polycarbonate resin composition once molten into pellets in air without contact with water), and in-water hot cutting (a method of cutting the polycarbonate resin composition once molten in water and simultaneously cooling it for pelletization).

The pellets of the polycarbonate resin composition obtained are preferably dried, as required, according to a drying method using a hot-air drying furnace, a vacuum drying furnace, a dehumidifying and drying furnace, or the like.

There may be cases where phenolic compounds which can be generated during production as by-products or unreacted residual diol components or diester carbonates are present as impurities in the polycarbonate resin thus obtained.

The phenolic compounds and the diester carbonates which are impurities can decrease strength or cause odors in formed articles to be obtained. Therefore, these are preferably contained as little as possible.

The content of the residual phenolic compounds is preferably 3000 mass ppm or less, more preferably 2000 mass ppm or less, more preferably 1000 mass ppm or less, further preferably 800 mass ppm or less, furthermore preferably 500 mass ppm or less, particularly preferably 300 mass ppm or less, with respect to 100 mass % of the polycarbonate resin.

The content of the residual diol components is preferably 1000 mass ppm or less, more preferably 500 mass ppm or less, further preferably 100 mass ppm or less, furthermore preferably 10 mass ppm or less, with respect to 100 mass % of the polycarbonate resin.

The content of the residual diester carbonates is preferably 1000 mass ppm or less, more preferably 500 mass ppm or less, further preferably 100 mass ppm or less, furthermore preferably 10 mass ppm or less, with respect to 100 mass % of the polycarbonate resin.

The contents of the phenolic compounds, the diol components, and the diester carbonates may be reduced to an undetectable level, but they may be slightly contained in view of productivity, as long as the effects are not impaired. A slight amount can allow good plasticity when melting the resin.

The contents of the phenolic compounds, the diol components, and the diester carbonates each may be, for example, 0.01 mass ppm or more, 0.1 mass ppm or more, or 1 mass ppm or more, with respect to 100 mass % of the polycarbonate resin.

The contents of the phenolic compounds, the diol components, and the diester carbonates in the polycarbonate resin can be adjusted so as to fall within such ranges by appropriately adjusting the conditions for polycondensation and the settings of apparatuses. Further, it can be adjusted also by the conditions for the extrusion step after polycondensation.

[Polycarbonate Resin Composition]

The polycarbonate resin composition of the present invention (which may be hereinafter referred to simply as "resin composition") contains the polycarbonate resin according to one embodiment of the present invention described above.

In the resin composition according to one embodiment of the present invention, the content of the polycarbonate resin which is one embodiment of the present invention described above is generally 30 to 100 mass %, preferably 50 to 100 mass %, more preferably 60 to 100 mass %, further preferably 70 to 100 mass %, furthermore preferably 80 to 100 mass %, based on the total amount (100 mass %) of the resin composition.

The polycarbonate resin composition according to one embodiment of the present invention may contain resins other than the polycarbonate resin of the present invention, as long as the effects of the present invention are not impaired.

Examples of the other resins include thermoplastic polyester resins such as polycarbonate resins other than the polycarbonate resin of the present invention, polyethylene terephthalate resins (PET resins), polytrimethylene terephthalate resins (PTT resins), and polybutylene terephthalate resins (PBT resins); styrene resins such as polystyrene resins (PS resins), high-impact polystyrene resins (HIPS), acrylonitrile-styrene copolymers (AS resins), and methyl methacrylate-styrene copolymers (MS resins); elastomers such as core/shell elastomers, e.g., methyl methacrylate-acrylic rubber-styrene copolymers (MAS), and polyester elastomers;

polyolefin resins such as cyclic cycloolefin resins (COP resins), cyclic cycloolefin (COP) copolymer resins, polyethylene resins (PE resins), and polypropylene resins (PP resins); polyamide resins (PA resins); polyimide resins (PI resins); polyetherimide resins (PEI resins); polyurethane resins (PU resins); polyphenylene ether resins (PPE resins); polyphenylene sulfide resins (PPS resins); polysulfone resins (PSU resins); polymethacrylate resins (PMMA resins); and polycaprolactones.

One of these other resins may be contained alone, or two or more of them may be contained in combination.

As the polycarbonate resins other than the polycarbonate resin of the present invention, aromatic polycarbonate resins are preferred.

Examples of monomers to serve as raw materials for the aromatic polycarbonate resins include the following aromatic dihydroxy compounds: dihydroxybenzenes such as 1,2-dihydroxybenzene, 1,3-dihydroxybenzene (that is, resorcinol), and 1,4-dihydroxybenzene; dihydroxybiphenyls such as 2,5-dihydroxybiphenyl, 2,2'-dihydroxybiphenyl, and 4,4'-dihydroxybiphenyl; dihydroxynaphthalenes such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene, and 2,7-dihydroxynaphthalene; dihydroxydiaryl ethers such as 2,2'-dihydroxydiphenylether, 3,3'-dihydroxydiphenylether, 4,4'-dihydroxydiphenylether, 4,4'-dihydroxy-3,3'-dimethyl diphenyl ether, 1,4-bis(3-hydroxyphenoxy)benzene, and 1,3-bis(4-hydroxyphenoxy)benzene; bis(hydroxyaryl)alkanes such as 2,2-bis(4-hydroxyphenyl)propane (that is, bisphenol A), 1,1-bis(4-hydroxyphenyl)propane, 2,2-bis(3-methyl-4-hydroxyphenyl)propane, 2,2-bis(3-methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(3,5-dimethyl-4-hydroxyphenyl)propane, 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,3-bis[2-(4-hydroxyphenyl)-2-propyl]benzene, bis(4-hydroxyphenyl) methane, bis(4-hydroxyphenyl)cyclohexylmethane, bis(4-hydroxyphenyl) phenylmethane, bis(4-hydroxyphenyl) (4-propenyl phenyl)methane, bis(4-hydroxyphenyl)diphenylmethane, bis(4-hydroxyphenyl)naphthylmethane, 1,1-bis (4-hydroxyphenyl)ethane, 1,1-bis(4-hydroxyphenyl)-1-phenylethane, 1,1-bis(4-hydroxyphenyl)-1-naphthylethane, 1,1-bis(4-hydroxyphenyl)butane, 2,2-bis (4-hydroxyphenyl)butane, 2,2-bis(4-hydroxyphenyl)pentane, 1,1-bis(4-hydroxyphenyl)hexane, 2,2-bis (4-hydroxyphenyl)hexane, 1,1-bis(4-hydroxyphenyl)octane, 2,2-bis(4-hydroxyphenyl) octane, 4,4-bis (4-hydroxyphenyl)heptane, 2,2-bis(4-hydroxyphenyl)nonane, 1,1-bis(4-hydroxyphenyl)decane, and 1,1-bis (4-hydroxyphenyl)dodecane; bis(hydroxyaryl)cycloalkanes such as 1,1-bis(4-hydroxyphenyl)cyclopentane, 1,1-bis (4-hydroxyphenyl)cyclohexane, 1,1-bis(4-hydroxyphenyl)-3,3-dimethylcyclohexane, 1,1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis (4-hydroxyphenyl)-3-propyl-5-methyl cyclohexane, 1,1-bis (4-hydroxyphenyl)-3-tert-butyl-cyclohexane, 1,1-bis (4-hydroxyphenyl)-4-tert-butyl-cyclohexane, 1,1-bis (4-hydroxyphenyl)-3-phenyl cyclohexane, and 1,1-bis (4-hydroxyphenyl)-4-phenylcyclohexane; cardo structure-containing bisphenols such as 9,9-bis(4-hydroxyphenyl)fluorene and 9,9-bis(4-hydroxy-3-methylphenyl)fluorene; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

Among them, bis(hydroxyaryl)alkanes are preferred, bis (4-hydroxyphenyl)alkanes are further preferred, and 2,2-bis (4-hydroxyphenyl)propane (that is, bisphenol A) is particularly preferred, in view of the marketability.

One of the aromatic dihydroxy compounds may be used, or two or more of them may be used in any combination at any ratio.

When the resin composition according to one embodiment of the present invention contains the polycarbonate resin of the present invention as a main component, the content of the other resins may be 0 to 100 parts by mass, 0 to 50 parts by mass, 0 to 20 parts by mass, 0 to 10 parts by mass, 0 to 5 parts by mass, or 0 to 1 part by mass, with respect to 100 parts by mass of the total amount of the polycarbonate resin of the present invention contained in the resin composition.

Meanwhile, when the resin composition contains the other resins as main components, the content of the polycarbonate resin of the present invention may be 0.01 to 100 parts by mass, 0.05 to 70 parts by mass, 0.10 to 50 parts by mass, 0.30 to 40 parts by mass, 0.50 to 30 parts by mass, 0.70 to 20 parts by mass, or 1.0 to 10 parts by mass, with respect to 100 parts by mass of the total amount of the other resins contained in the resin composition.

The resin composition according to one embodiment of the present invention may contain a polycarbonate resin ($\beta$) having the structural unit (II) represented by formula (2) above as another resin together with the polycarbonate resin ($\alpha$) of the present invention.

The content ratio $[(\alpha)/(\beta)]$ of the polycarbonate resin ($\alpha$) to the polycarbonate resin ($\beta$) in the resin composition is preferably 0.01/99.99 to 99.99/0.01, more preferably 0.05/99.95 to 50/50, further preferably 0.1/99.9 to 20/80, further preferably 0.2/99.8 to 10/90, furthermore preferably 0.3/99.7 to 7.5/92.5, particularly preferably 0.5/99.5 to 5.0/95.0, by mass ratio.

The resin composition according to one embodiment of the present invention may further contain various additives, as long as the effects of the present invention are not impaired.

As such various additives, heat stabilizers, antioxidants, flame retardants, flame retardant aids, ultraviolet absorbers, mold release agents, colorants, and the like are preferably contained, and antistatic agents, fluorescent whitening agents, antifogging agents, fluidity improvers, plasticizers, dispersants, antibacterial agents, and the like may be contained, as required, though they are appropriately selected depending on the application.

<Heat Stabilizers>

Examples of the heat stabilizers to be used in one embodiment of the present invention can include phenolic heat stabilizers, phosphorus heat stabilizers, and sulfur heat stabilizer, specifically, phosphorus oxoacids such as phosphoric acid, phosphonic acid, phosphorous acid, phosphinic acid, and polyphosphoric acid; acidic pyrophosphate metal salts such as acidic sodium pyrophosphate, acidic potassium pyrophosphate, and acidic calcium pyrophosphate; phosphates of Group 1 or Group 10 metals such as potassium phosphate, sodium phosphate, cesium phosphate, and zinc phosphate; and organic phosphate compounds, organic phosphite compounds, and organic phosphonite compounds.

Further, it is preferred to use at least one selected from the group consisting of a phosphite ester compound (a) in which at least one ester in a molecule is esterified with a phenol and/or a phenol having at least one alkyl group having 1 to 25 carbon atoms, phosphorous acid (b), and tetrakis(2,4-di-t-butylphenyl)-4,4'-biphenylene-di-phosphonite (c).

Examples of the phosphite ester compound (a) include trioctyl phosphite, trioctadecyl phosphite, tridecyl phosphite, trilauryl phosphite, tristearyl phosphite, triphenyl phosphite, tris(monononylphenyl) phosphite, tris(mononyl/dinonylphenyl) phosphite, trisnonylphenyl phosphite, tris(octylphenyl) phosphite, tris(2,4-di-t-butylphenyl) phosphite, trinonyl phosphite, didecylmonophenyl phosphite, dioctylmonophenyl phosphite, diisopropylmonophenyl phosphite, monobutyldiphenyl phosphite, monodecyldiphenyl phosphite, bis(2,4-di-t-butylphenyl)pentaerythritol phosphite, bis(2,6-di-t-butyl-4-methylphenyl)pentaerythritol phosphite, monooctyldiphenyl phosphite, distearyl pentaerythritol diphosphite, tricyclohexyl phosphite, diphenyl pentaerythritol diphosphite, bis(2,6-di-t-butyl-4-methylphenyl)pentaerythritol diphosphite, 2,2-methylenebis(4,6-di-t-butylphenyl)octyl phosphite, bis(nonylphenyl)pentaerythritol diphosphite, bis(2,4-di-t-butylphenyl)pentaerythritol diphosphite, and bis(2,6-di-t-butyl-4-ethylphenyl)pentaerythritol diphosphite.

As the organic phosphite compounds, commercially available products may be used. Examples thereof include "ADK STAB 1178", "ADK STAB 2112", and "ADK STAB HP-10" (product names, the same applies to the followings), available from ADEKA Corporation, "JP-351", "JP-360", and "JP-3CP" available from Johoku Chemical Co., Ltd., and "Irgafos 168" available from BASF SE.

Examples of phosphate esters include trimethyl phosphate, triethyl phosphate, tributyl phosphate, trioctyl phosphate, triphenyl phosphate, tricresyl phosphate, tris(nonylphenyl) phosphate, and 2-ethylphenyl diphenyl phosphate.

One of these heat stabilizers may be used alone, or two or more of them may be used in combination.

In the resin composition according to one embodiment of the present invention, the content of the heat stabilizers is preferably 0.001 to 1 part by mass, more preferably 0.01 to 0.7 parts by mass, further preferably 0.03 to 0.5 parts by mass, with respect to 100 parts by mass of the polycarbonate resin contained in the resin composition.

<Antioxidants>

Examples of the antioxidants to be used in one embodiment of the present invention include phenolic antioxidants, hindered phenolic antioxidants, bisphenolic antioxidants, and polyphenolic antioxidants, specifically, 2,6-di-t-butyl-4-methylphenol, tris(3,5-di-t-butyl-4-hydroxybenzyl)isocyanurate, n-octadecyl-3-(3',5'-di-t-butyl-4'-hydroxyphenyl) propionate, tetrakis[methylene-3-(3,5-di-t-butyl-4-hydroxyphenyl)propionate]methane, 4,4'-butylidenebis-(3-methyl-6-t-butylphenol), triethylene glycol-bis[3-(3-t-butyl-4-hydroxy-5-methylphenyl) propionate], 3,9-bis{2-[3-(3-t-butyl-4-hydroxy-5-methylphenyl)propionyloxy]-1,1-dimethylethyl}-2,4,8,10-tetraoxaspiro[5,5]undecane, pentaerythritol tetrakis[3-(3,5-di-t-butyl-4-hydroxyphenyl) propionate], thiodiethylenebis[3-(3,5-di-t-butyl-4-hydroxyphenyl)propionate], N,N'-hexane-1,6-diylbis[3-(3,5-di-t-butyl-4-hydroxyphenyl propionamide)], 2,4-dimethyl-6-(1-methylpentadecyl)phenol, diethyl[[3,5-bis(1,1-dimethylethyl)-4-hydroxyphenyl]methyl] phosphoate, 3,3', 3'',5,5',5''-hexa-t-butyl-a,a', a''-(mesitylene-2,4,6-triyl)tri-p-cresol, 4,6-bis(octylthiomethyl)-o-cresol, ethylenebis (oxyethylene)bis[3-(5-t-butyl-4-hydroxy-m-tolyl) propionate], hexamethylenebis[3-(3,5-di-t-butyl-4-hydroxyphenyl) propionate], 1,3,5-tris(3,5-di-t-butyl-4-hydroxybenzyl)-1,3,5-triazine-2,4,6(1H,3H,5H)-trion, and 2,6-di-t-butyl-4-(4,6-bis(octylthio)-1,3,5-triazin-2-ylamino)phenol.

As the phenolic antioxidants, commercially available products may be used. Examples thereof include "Irganox 1010" and "Irganox 1076" available from BASF SE ((R), the same applies to the followings) and "ADK STAB AC-50" and "ADK STAB AO-60" available from ADEKA Corporation ((R), the same applies to the followings).

One of these antioxidants may be used alone, or two or more of them may be used in combination.

In the resin composition according to one embodiment of the present invention, the content of the antioxidants is preferably 0.001 to 1 part by mass, more preferably 0.01 to 0.5 parts by mass, with respect to 100 parts by mass of the polycarbonate resin contained in the resin composition.

<Flame Retardants>

Examples of the flame retardants to be used in one embodiment of the present invention include organometallic salt flame retardants, phosphorus flame retardants, and silicone flame retardants, specifically, the flame retardant (flame retardant composition) described in paragraphs [0085] to [0093] of Japanese Patent Laid-Open No. 2016-183422, the disclosure which is incorporated in this description.

Among these, the flame retardants to be used in one embodiment of the present invention preferably contain organic sulfonic acid metal salts.

Examples of the organic sulfonic acid metal salts to be used as the flame retardants include aliphatic sulfonic acid metal salts and aromatic sulfonic acid metal salts. The metal salts are preferably alkali metal salts and alkaline earth metal salts.

Examples of the alkali metals constituting the metal salts include sodium, lithium, potassium, rubidium, and cesium. Further, examples of the alkaline earth metals constituting the metal salts include calcium and strontium.

Among these, preferred examples of the metals constituting the organic sulfonic acid metal salts to be used in one embodiment of the present invention include an alkali metal selected from sodium, potassium, rubidium, and cesium, more preferably sodium or potassium, for effectively promoting the formation of a carbonized layer during combustion and achieving a forming material of a formed article capable of maintaining high transparency.

Examples of the aliphatic sulfonates preferably include fluoroalkane-sulfonic acid metal salts, more preferably perfluoroalkane-sulfonic acid metal salts, specifically, perfluorobutane-sodium sulfonate, perfluorobutane-potassium sulfonate, perfluoroethane-sodium sulfonate, and perfluoroethane-potassium sulfonate.

The fluoroalkylsulfonic acid metal salts preferably have 1 to 8, more preferably 2 to 4 carbon atoms, for achieving a forming material of a formed article capable of maintaining high transparency.

Examples of the aromatic sulfonic acid metal salts preferably include aromatic sulfonic acid alkali metal salts, specifically, sodium 3,4-dichlorobenzene sulfonate, sodium 2,4,5-trichlorobenzene sulfonate, sodium benzene sulfonate, the sodium salt of diphenylsulfone-3-sulfonic acid, the potassium salt of diphenylsulfone-3-sulfonic acid, the sodium salt of 4,4'-dibromodiphenyl-sulfone-3-sulfonic acid, the potassium salt of 4,4'-dibromophenyl-sulfone-3-sulfonic acid, the disodium salt of diphenylsulfone-3,3'-disulfonic acid, the dipotassium salt of diphenylsulfone-3, 3'-disulfonic acid, sodium dodecylbenzene sulfonate, potassium dodecylbenzene sulfonate, potassium p-toluenesulfonate, and potassium p-styrenesulfonate.

Such an organic sulfonic acid metal salt is preferably the potassium salt of diphenylsulfone-3-sulfonic acid, potassium p-toluenesulfonate, potassium p-styrenesulfonate, or potassium dodecylbenzene sulfonate, more preferably the potassium salt of diphenylsulfone-3-sulfonic acid, for achieving a forming material of a formed article with improved transparency.

One of these flame retardants may be used alone, or two or more of them may be used in combination.

In the resin composition according to one embodiment of the present invention, the content of the flame retardants is preferably 0.005 to 0.2 parts by mass, more preferably 0.01 to 0.15 parts by mass, further preferably 0.03 to 0.12 parts by mass, with respect to 100 parts by mass of the polycarbonate resin contained in the resin composition.

When the resin composition according to one embodiment of the present invention contains such flame retardants, the content of the flame retardants other than the organic sulfonic acid metal salts is preferably 0.1 parts by mass or less, more preferably 0.01 parts by mass or less, further preferably 0.001 parts by mass or less, with respect to 100 parts by mass of the organic sulfonic acid metal salts.

Further, the resin composition according to one embodiment of the present invention may have an embodiment of containing substantially no flame retardants. The content of the flame retardants in such an embodiment is preferably less than 0.005 parts by mass, more preferably less than 0.001 parts by mass, further preferably less than 0.0001 parts by mass, with respect to 100 parts by mass of the polycarbonate resin contained in the resin composition.

<Flame Retardant Aids>

Examples of the flame retardant aids to be used in one embodiment of the present invention include silicone compounds, and silicone compounds having a phenyl group in a molecule are preferred for enhancing the dispersibility in the resin composition and achieving a forming material of a formed article which can improve the transparency and the flame retardancy.

The weight-average molecular weight (Mw) of the silicone compounds is preferably 450 to 5000, more preferably 750 to 4000, further preferably 1000 to 3000, furthermore preferably 1500 to 2500.

The weight-average molecular weight of 450 or more can enhance the productivity and can further improve the flame retardancy. Further, the weight-average molecular weight of 5000 or less can effectively suppress the decrease of the dispersibility in the resin composition and can maintain good flame retardancy and good mechanical properties.

One of these flame retardant aids may be used alone, or two or more of them may be used in combination.

In the resin composition according to one embodiment of the present invention, the content of the flame retardant aids is preferably 0.1 to 7.5 parts by mass, more preferably 0.2 to 5 parts by mass, with respect to 100 parts by mass of the polycarbonate resin contained in the resin composition.

<Ultraviolet Absorbers>

Examples of the ultraviolet absorbers to be used in one embodiment of the present invention include inorganic ultraviolet absorbers such as cerium oxide and zinc oxide, and organic ultraviolet absorbers such as benzotriazole compounds, benzophenone compounds, salicylate compounds, cyanoacrylate compounds, triazine compounds, oxanilide compounds, malonic acid ester compounds, hindered amine compounds, and phenyl salicylate compounds.

Among these, organic ultraviolet absorbers are preferred, and benzotriazole compounds or benzophenone compounds are more preferred, as the ultraviolet absorbers.

Examples of the benzotriazole compounds include 2-(2'-hydroxy-5'-methylphenyl)benzotriazole, 2-[2'-hydroxy-3',5'-bis($\alpha,\alpha$-dimethylbenzyl)phenyl]-benzotriazole, 2-(2'-hydroxy-3',5'-di-t-butyl-phenyl)-benzotriazole, 2-(2'-hydroxy-3'-t-butyl-5'-methylphenyl)-5-chlorobenzotriazole, 2-(2'-hydroxy-3',5'-di-t-butyl-phenyl)-5-chlorobenzotriazole, 2-(2'-hydroxy-3',5'-di-t-amyl)-benzotriazole, 2-(2'-hydroxy-5'-t-octylphenyl)benzotriazole, 2,2'-methylenebis[4-(1,1,3,3-tetramethylbutyl)-6-(2N-benzotriazol-2-yl)phenol], 2-(4,6-diphenyl-1,3,5-triazin-2-yl)-5-[(hexyl)oxy]-phenol, 2-[4,6-bis(2,4-dimethylphenyl)-1,3,5-triazine-2-yl]-5-(octyloxy) phenol, 2,2'-(1,4-phenylene)bis[4H-3,1-benzoxazin-4-one], [(4-methoxyphenyl)-methylene ]-propanedioic acid-dimethyl ester, 2-(2H-benzotriazol-2-yl)-p-cresol, 2-(2H-benzotriazol-2-yl)-4,6-bis(1-methyl-1-phenylmethyl)phenol, 2-[5-chloro (2H)-benzotriazol-2-yl]-4-methyl-6-(t-butyl) phenol, 2,4-di-t-butyl-6-(5-chlorobenzotriazol-2-yl)phenol, 2-(2H-benzotriazol-2-yl)-4-(1,1,3,3-tetrabutyl)phenol, 2,2'-methylenebis[6-(2H-benzotriazol-2-yl)-4-(1,1,3,3-tetrabutyl)phenol], and [methyl-3-[3-t-butyl-5-(2H-benzotriazol-2-yl)-4-hydroxyphenyl]propionate-polyethylene glycol] condensates.

Among these, 2-(2'-hydroxy-5'-t-octylphenyl)benzotriazole or 2,2'-methylene-bis[4-(1,1,3,3-tetramethylbutyl)-6-(2N-benzotriazol-2-yl)phenol] is preferred as such a benzotriazole compound.

Examples of the benzophenone compounds include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'-dihydroxy-4-methoxy-benzophenone, 2,2'-dihydroxy-4,4'-dimethoxy-benzophenone, and 2,2',4,4'-tetrahydroxy-benzophenone.

Examples of the phenyl salicylate compounds include phenyl salicylate and 4-t-butyl-phenyl salicylate.

Examples of the triazine compounds include 2-(4,6-diphenyl-1,3,5-triazin-2-yl)-5-[(hexyl)oxy]-phenol and 2-[4,6-bis(2,4-dimethylphenyl)-1,3,5-triazin-2-yl]-5-(octyloxy) phenol.

Examples of the hindered amine compounds include bis(2,2,6,6-tetramethylpiperidin-4-yl) sebacate.

One of these ultraviolet absorbers may be used alone, or two or more of them may be used in combination.

In the resin composition according to one embodiment of the present invention, the content of the ultraviolet absorbers is preferably 0.01 to 3 parts by mass, more preferably 0.1 to 1 part by mass, with respect to 100 parts by mass of the polycarbonate resin contained in the resin composition.

<Mold Release Agents>

Examples of the mold release agents to be used in one embodiment of the present invention include aliphatic carboxylic acids, carboxylic acid esters of an aliphatic carboxylic acid and an alcohol, aliphatic hydrocarbon compounds with a number-average molecular weight of 200 to 15000, and polysiloxane compounds.

Examples of the aliphatic carboxylic acids include monovalent, divalent, or trivalent saturated or unsaturated aliphatic carboxylic acids, monovalent or divalent saturated or unsaturated aliphatic carboxylic acids having 6 to 36 carbon atoms are preferred, and monovalent saturated aliphatic carboxylic acids having 6 to 36 carbon atoms are more preferred.

The aliphatic carboxylic acids include alicyclic carboxylic acids.

Specific examples of the aliphatic carboxylic acids include palmitic acid, stearic acid, valeric acid, caproic acid, capric acid, lauric acid, arachic acid, behenic acid, lignoceric acid, cerotic acid, melissic acid, tetratriacontanoic acid, montanic acid, glutaric acid, adipic acid, and azelaic acid.

Examples of the aliphatic carboxylic acids constituting the carboxylic acid esters are the same as above, and examples of the alcohol include monovalent or multivalent saturated or unsaturated alcohols, preferably monovalent or multivalent saturated alcohols having 1 to 30 carbon atoms, more preferably monovalent or multivalent saturated aliphatic alcohols having 1 to 30 carbon atoms.

The aliphatic saturated alcohols include alicyclic saturated alcohols. Further, at least one hydrogen of such an alcohol is optionally substituted with a substituent such as a fluorine atom or an aryl group.

Specific examples of the alcohols include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol.

The carboxylic acid esters may contain aliphatic carboxylic acids and/or alcohols as impurities or may be mixtures of a plurality of compounds.

Specific examples of the carboxylic acid esters include beeswax (a mixture containing myricyl palmitate as a main component), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate, and pentaerythritol tetrastearate.

Examples of the aliphatic hydrocarbon compounds include liquid paraffin, paraffin wax, micro wax, polyethylene wax, Fischer-Tropsch wax, and α-olefin oligomers having 3 to 12 carbon atoms.

The aliphatic hydrocarbon compounds also include alicyclic hydrocarbons.

Further, these aliphatic hydrocarbon compounds may be partially oxidized.

Among these, a partial oxide of paraffin wax, polyethylene wax, or polyethylene wax is preferred, and paraffin wax or polyethylene wax is more preferred.

Examples of the polysiloxane compounds preferably include polysiloxane silicone oils, e.g., dimethyl silicone oil, phenylmethyl silicone oil, diphenyl silicone oil, and fluorinated alkyl silicone.

One of these mold release agents may be used alone, or two or more of them may be used in combination.

In the resin composition according to one embodiment of the present invention, the content of the mold release agents is preferably 0.001 to 2 parts by mass, more preferably 0.01 to 1 part by mass, with respect to 100 parts by mass of the polycarbonate resin contained in the resin composition.

<Colorants>

Examples of the colorants to be used in one embodiment of the present invention include inorganic pigments, organic pigments, and organic dyes.

Examples of the inorganic pigments include sulfide pigments such as carbon black, cadmium red, and cadmium yellow; silicate pigments such as ultramarine; oxide pigments such as titanium oxide, zinc flower, red iron oxide (Bengala), chromium oxide, iron black, titanium yellow, zinc-iron brown, titanium cobalt green, cobalt green, cobalt blue, copper-chromium black, and copper-iron black; chromium acid pigments such as chrome yellow and molybdate orange; and ferrocyanide pigments such as iron blue.

Examples of the organic pigments or the organic dyes include phthalocyanine dye pigments (hereinafter, dyes or pigments may be referred to also as "dye pigments") such as copper phthalocyanine blue and copper phthalocyanine green; azo dye pigments such as nickel azo yellow; thioindigo, perinone, perylene, quinacridone, dioxazine, isoindolinone, quinophthalone, and other condensed polycyclic dye pigments; and quinoline, anthraquinone, heterocyclic, and methyl dye pigments.

Among these, one or more selected from titanium oxide, carbon black, cyanine dye pigments, quinoline dye pigments, anthraquinone dye pigments, and phthalocyanine dye pigments are preferred in view of the thermostability.

Further, the colorants to be used in one embodiment of the present invention may be master-batched with polystyrene resins, polycarbonate resins, acrylic resins, or the like for improving the handleability during extrusion and the dispersibility into the resin composition.

One of these colorants may be used alone, or two or more of them may be used in combination.

In the resin composition according to one embodiment of the present invention, the content of the colorants is preferably 0.1 to 5 parts by mass, more preferably 0.1 to 3 parts by mass, further preferably 0.1 to 2 parts by mass, with respect to 100 parts by mass of the polycarbonate resin contained in the resin composition.

<Physical Properties of Polycarbonate Resin Composition>

The polycarbonate resin composition of the present invention has more excellent flame retardancy and can be a forming material of a formed article with reduced flame burning time according to a more preferred embodiment.

Specifically, the polycarbonate resin composition is preferably evaluated to be V-2 or higher, more preferably V-1 or more, further preferably V-0, in a combustibility test according to the UL94 standard.

In this description, the evaluation of the combustibility test according to the UL94 standard refers to a value measured according to the method described in Examples below.

Further, the flame burning time of the polycarbonate resin composition according to one embodiment of the present invention, as measured by the method described in Examples below, is preferably 20 seconds or less, more preferably 16 seconds or less, further preferably 13 seconds or less, furthermore preferably 10 seconds or less, particularly preferably 0 seconds.

<Formed Article>

The formed article of the present invention is constituted by forming the polycarbonate resin composition according to one embodiment of the present invention.

In the formed article according to one embodiment of the present invention, the shape, pattern, color, dimensions, and the like can be appropriately selected according to the application of the formed article.

The formed article according to one embodiment of the present invention can be formed into parts of electric electronic equipment, OA (Office Automation) equipment, information terminal equipment, mechanical parts, home appliances, vehicle parts, construction members, various containers, leisure goods/miscellaneous goods, illumination equipment, and the like, parts of various domestic electrical products, and the like, housings, containers, covers, storages, and cases of electric appliances, and covers and cases of lighting equipment, for example.

Examples of the electric electronic equipment include display devices of personal computers, game machines, television receivers, liquid crystal display devices, plasma display devices, and the like, printers, copy machines, scanners, faxes, electronic notebooks, personal digital assistants (PDAs), electronic desktop calculators, electronic dictionaries, cameras, video cameras, mobile phones, battery packs, drives and readers of recording media, mice, numeric keypads, various music players, and carrying radios/audio players.

Further, examples of the formed product also include illumination signboards, liquid crystal backlights, illumination displays, traffic signs, signboards, screens, car parts such as reflectors and meter parts, toys, and accessories.

The method for producing the formed article according to one embodiment of the present invention is not specifically limited, and any forming method generally employed for polycarbonate resin compositions can be employed. Forming methods such as hollow forming including injection molding, ultra-high-speed injection molding, injection compression molding, two-color molding, and gas assisting, forming methods using heat insulating molds, and forming methods using rapid heating molds, foam molding (including supercritical fluids), insert molding, IMC (in-mold coating) molding, extrusion molding, sheet forming, thermoforming, rotation forming, laminate molding, and press molding can be employed, for example. Further, forming methods using hot runners can also be used.

EXAMPLES

Hereinafter, the present invention will be described by way of Examples, but the present invention is not limited to these Examples at all. The measured values in Examples were measured using the following methods or apparatuses.
(1) Weight-Average Molecular Weight (Mw), Number-Average Molecular Weight (Mn), and Molecular Weight Distribution (Mw/Mn)

Using a standard polystyrene (product name: "PStQuick MP-M" available from TOSOH CORPORATION) with a known molecular weight (molecular weight distribution=1), a standard curve was plotted under the following measurement conditions by GPC (gel permeation chromatography). The elution time and the molecular weight value of each peak were plotted from the standard polystyrene measured and approximated by a cubic equation to obtain calibration curves. [Measurement conditions]
Apparatus: Product name: "HLC-8320GPC" available from TOSOH CORPORATION
Columns: One guard column (TSKguardcolumn SuperMPHZ-M) and three analytical columns (TSKgel SuperMultiporeHZ-M)
Solvent: Chloroform (HPLC grade)
Injection volume: 10 μL
Sample concentration: 0.2 w/v %
Solvent flow rate: 0.35 ml/min
Measurement temperature: 40° C.
Detector: RI Then, the weight-average molecular weight (Mw) and the number-average molecular weight (Mn) were determined as polystyrene-equivalent values by the following formulas based on the calibration curves obtained, to calculate a molecular weight distribution (Mw/Mn). [Calculation formulas]

$$Mw = \Sigma(W_i \times M_i)/\Sigma(W_i)$$

$$M_n = \Sigma(N_i \times M_i)/\Sigma(N_i)$$

Molecular weight distribution=Mw/Mn wherein i represents the i-th division point, $W_i$ represents the i-th weight, $N_i$ represents the i-th molecular number, and $M_i$ represents the i-th molecular weight, when dividing the molecular weight M. Further, the molecular weight M represents the polystyrene-equivalent molecular weight in each calibration curve at the same elution time.
(2) Glass Transition Temperature (Tg)

The glass transition temperature (Tg) was measured using a differential scanning calorimeter (DSC) (product name: "DSC-7000" available from Hitachi High-Tech Science Corporation).

The measurement sample was prepared by weighing 7 to 12 mg of each test piece into a sample container for AI autosampler (RDC aluminum pan, a circular cylindrical container with a diameter of 6.8 mm and a height of 2.5 mm) and sealing the upper part of the sample container with a cover for AI autosampler.

The measurement was performed under a nitrogen atmosphere (nitrogen flow rate: 50 ml/min), and 10.0 mg of sapphire was used as a standard substance in the reference cell. Then, the measurement sample adjusted to 30° C. was heated to 220° C. at 10° C./min and then cooled to 30° C. at 10° C./min. Thereafter, the measurement sample was again heated to 270° C. at 10° C./min and measured.
(3) Method for Measuring Pyrolysis Temperature The pyrolysis temperature was measured using a simultaneous thermogravimetric analyzer (TG/TDA) (product name: "TGDTA7300" available from Hitachi High-Tech Science Corporation).

The measurement sample was prepared by weighing 2 mg of each test piece into a platinum pan (Pt open sample container, a circular cylindrical container with a diameter of 5.2 mm and a height of 2.5 mm).

The measurement was performed under a nitrogen atmosphere (nitrogen flow rate: 250 ml/min), and 0.00519 g of α-alumina was used as a standard substance in the reference cell. Then, the measurement sample adjusted to 30° C. was heated to 550° C. at 10° C./min and measured.
(4) Content Ratio of Structural Units The content ratio of structural units derived from each raw material monomer of the polycarbonate resin in Table 1 was calculated by measuring the abundance of 1H belonging to the raw material monomer based on the following $^1$H-NMR measurement conditions.
($^1$H-NMR measurement conditions)
Apparatus: JNM-ECA500 (500 MHz), available from JEOL Ltd.
Measurement mode: $^1$H-NMR
Solvent: CDCl$_3$ (deuterated chloroform)
Internal standard substance: Tetramethylsilane The structures of the raw material compounds used in Examples are shown below together with abbreviations.

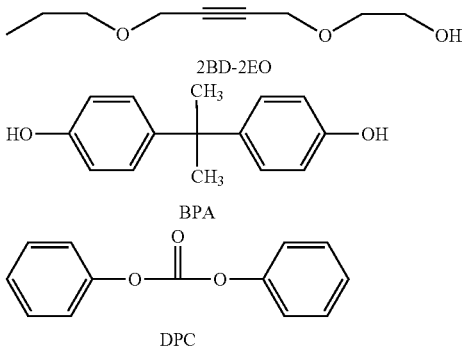

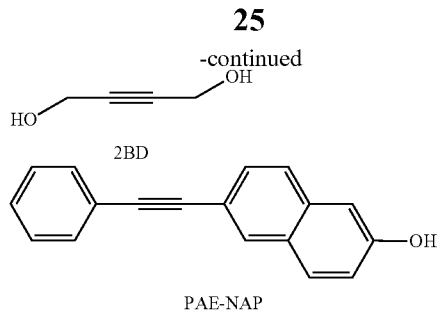

Example 1

As raw material monomers, 2BD-2EO (1.44 g, 8.27 mmol), BPA (68.56 g, 300.32 mmol), DPC (68.09 g, 317.85 mmol), and cesium carbonate (CsCO$_3$, 1×10$^{-6}$ mol with respect to a total of 1 mol of 2BD-2EO and BPA) as a catalyst were accurately weighed into a 300-mL four-necked flask, followed by drying under reduced pressure at normal temperature under vacuum for one hour. Thereafter, the reactor was purged with nitrogen three times, so that the inside was under a nitrogen atmosphere.

A stirrer and a distillation apparatus were attached to the four-necked flask, followed by heating to 195° C. under a nitrogen atmosphere at a pressure of 101.3 kPa. It was confirmed after heating that the raw material monomers were completely dissolved, and then the pressure in the reactor was reduced to 27 kPa, followed by stirring for 80 minutes.

Then, the temperature was raised to 200° C. at a heating rate of 30° C./h and maintained at 200° C. for 20 minutes to allow the reaction to proceed. Thereafter, the pressure inside the reactor was reduced to 24 kPa, followed by stirring for 10 minutes.

Then, the temperature was raised to 210° C. at a heating rate of 60° C./h, and the pressure inside the reactor was reduced to 20 kPa, followed by stirring for 10 minutes.

Further, the temperature was raised to 220° C. at a heating rate of 60° C./h, and the pressure inside the reactor was reduced to 14 Pa, followed by stirring for 10 minutes. Thereafter, the pressure was further reduced to 7 kPa, followed by stirring for 10 minutes.

Then, the temperature was raised to 230° C. at a heating rate of 60° C./h, and the pressure inside the reactor was reduced to 1 kPa or less, followed by stirring for 110 minutes, to terminate the reaction.

After the completion of the reaction, the pressure inside the reactor was returned to normal by introducing nitrogen therein, to obtain a polycarbonate resin (PC resin-1).

Example 2

A polycarbonate resin (PC resin-2) was obtained in the same manner as in Example 1 except that 2BD (1.42 g, 16.50 mmol), BPA (68.56 g, 300.32 mmol), and DPC (69.93 g, 326.44 mmol) were used as raw material monomers.

Comparative Example 1

A polycarbonate resin (PC resin-3) was obtained in the same manner as in Example 1 except that PAE-NAP (0.71 g, 2.90 mmol), BPA (68.56 g, 300.32 mmol), and DPC (68.09 g, 317.85 mmol) were used as raw material monomers.

Comparative Example 2

A commercially available BPA polycarbonate (product name: "EUPILON H-4000" available from Mitsubishi Engineering-Plastics Corporation) was used to give a polycarbonate resin (PC resin-4).

The polycarbonate resins (PC resin-1) to (PC resin-4) obtained were measured for physical property values according to the aforementioned measurement methods and subjected to the following flame retardancy test. Table 1 shows these results.

<Flame Retardancy Test>

The polycarbonate resins (PC resin-1) to (PC resin-4) obtained above were each subjected to an injection molding machine (product name: "SE50DUZ" available from Sumitomo Heavy Industries, Ltd.), to produce a test piece with a length of 12.5 mm, a width of 125 mm, and a thickness of 2 mm by injection molding under conditions of a cylinder temperature of 300° C. and a mold temperature of 120° C. Respectively for the PC resin-1 and the PC resin-4 of Example 1 and Comparative Example 2, test pieces with a length of 12.5 mm, a width of 125 mm, and a thickness of 1 mm were separately produced by injection molding under the same conditions. Five of these test pieces were produced for each.

Then, the test pieces with a thickness of 2 mm and the test pieces with a thickness of 1 mm (only Example 1 and Comparative Example 2) were evaluated for flame retardancy by the method according to Subject 94 (UL94) of UNDERWRITERS LABORATORIES INC. Specifically, the five test pieces produced were used and classified into any of "V-0", "V-1", "V-2", and "Incompatible (NG)" in descending order of flame retardancy. Further, the flame burning time (unit: seconds), which is the burning time of the most burned of the five test pieces, was also measured.

TABLE 1

| | Type | | Example 1 PC resin-1 | Example 2 PC resin-2 | Comparative Example 1 PC resin-3 | Comparative Example 2 PC resin-4 |
|---|---|---|---|---|---|---|
| Type of raw material monomer | Compound (Ia) equivalent | — | 2BD-2EO | 2BD | — | — |
| | Compound (IIa) equivalent | — | BPA | BPA | BPA | — |
| | Other monomers | — | — | — | PAE-NAP | — |
| | Other monomers | — | DPC | DPC | DPC | |
| Content of structural unit (I) | | mol % | 2.68 | 5.21 | — | |
| Content of structural unit (II) | | mol % | 97.32 | 94.79 | 0.96 | |
| Content of other structural units | | mol % | — | — | 99.04 | |
| Weight-average molecular weight (Mw) | | — | 23500 | 26900 | 36600 | 28400 |
| Number-average molecular weight (Mn) | | — | 11300 | 13700 | 16600 | 13200 |
| Molecular weight distribution (Mw/Mn) | | — | 2.08 | 1.96 | 2.21 | 2.15 |
| Glass transition temperature (Tg) | | ° C. | 130.1 | 135.6 | 147.6 | (*) |

TABLE 1-continued

| Type | | | Example 1 PC resin-1 | | Example 2 PC resin-2 | Comparative Example 1 PC resin-3 | Comparative Example 2 PC resin-4 | |
|---|---|---|---|---|---|---|---|---|
| Pyrolysis temperature | Mass decrease by 1% | °C. | 332.7 | | 338.4 | (*) | (*) | |
| | Mass decrease by 3% | °C. | 368.4 | | 378.3 | (*) | (*) | |
| | Mass decrease by 5% | °C. | 391.7 | | 405.0 | (*) | (*) | |
| | Mass decrease by 10% | °C. | 425.5 | | 441.8 | (*) | (*) | |
| Thickness of test piece for combustibility test | | mm | 1 | 2 | 2 | 2 | 1 | 2 |
| Combustibility test (UL94) | | — | V-0 | V-0 | V-2 | V-0 | V-2 | V-2 |
| Flame burning time | | sec | 0 | 0 | 13 | 26 | 0 | 23 |

(*): Unmeasured

From Table 1, the PC resins-1 and -2 obtained in Examples 1 and 2 had excellent flame retardancy, particularly, short flame burning time. Meanwhile, the PC resin-3 obtained in Comparative Example 1 had good results in the combustibility test according to the UL94 but had a long flame burning time, and thus there is room for improvement in flame retardancy. Further, the PC resin-4 of Comparative Example 2 had poor results in flame retardancy.

Example 3

(1) Synthesis of Polymer B (Homo-2BD-2EO PC)

As raw material monomers, 2BD-2EO (63.00 g, 361.7 mmol), DPC (79.80 g, 372.50 mmol), and zinc acetate ($Zn(Oac)_2$, $3 \times 10^{-6}$ mol with respect to 1 mol of 2BD-2EO) as a catalyst were accurately weighed into a 300-mL four-necked flask, followed by drying under reduced pressure at normal temperature under vacuum for one hour. Thereafter, the reaction system was purged with nitrogen three times, so as to be under a nitrogen atmosphere.

The reactor was put into a 300-mL reactor with a stirrer and a distillation apparatus under a nitrogen atmosphere at 101.3 kPa, followed by heating to 185° C. It was confirmed 10 minutes after the start of heating that the raw materials were completely dissolved, and then the degree of decompression was adjusted to 27 kPa. Thereafter, stirring was performed for 140 minutes under the same conditions. Thereafter, the degree of decompression was adjusted to 24 kPa, and stirring was performed for 60 minutes. Thereafter, the degree of decompression was adjusted to 20 kPa, and stirring was performed for 20 minutes. Thereafter, the degree of decompression was adjusted to 14 Pa, and stirring was performed for 10 minutes. Thereafter, the degree of decompression was adjusted to 7 kPa, and stirring was performed for 30 minutes. Thereafter, the degree of decompression was adjusted to 1 kPa or less, and stirring was further performed for 110 minutes. After the completion of the reaction, the pressure inside the reactor was returned to normal by introducing nitrogen therein, to obtain a polymer B (Homo-2BD-2EO PC), which is a polycarbonate resin generated. The Mw of the polymer B obtained was 16600, and the Mn thereof was 5500.

(2) Preparation of Polycarbonate Resin Composition

Using a resin mixer, Labo Prastomill (type: 4M150, available from Toyo Seiki Seisaku-sho, Ltd.), the temperature of the mixer part was raised to 280° C., and the mixer was rotated at 30 rpm. Then, 44.29 g of a polycarbonate resin using bisphenol A as a raw material, EUPILON H4000, available from Mitsubishi Engineering-Plastics Corporation (with the Mw and the Mn shown in Table 1) as a polymer A and 0.70 g of Homo-2BD-2EO PC obtained in the aforementioned procedure (1) as the polymer B were put into the mixer and mixed under stirring for 120 seconds, to obtain a polycarbonate resin composition.

(3) Measurement of Physical Property Values of Polycarbonate Resin Composition

As a result of measurement by the aforementioned methods, the physical property values of the polycarbonate resin obtained were as shown in Table 2. Under the same conditions as in the flame retardancy test, a test piece with a length of 12.5 mm, a width of 125 mm, and a thickness of 2 mm was produced by injection molding, and the test piece was subjected to the flame retardancy test (UL94) by the same procedures as above. As a result, it was determined to be V-0, and the flame burning time was five seconds.

TABLE 2

| Polymer used for mixing | | |
|---|---|---|
| Type of mixed polymer | — | Polymer A: EUPILON H4000 Polymer B: Homo-2BD-2EO PC |
| Weight-average molecular weight (Mw) of Polymer A | — | 27500 |
| Number-average molecular weight (Mn) of Polymer A | — | 12400 |
| Weight-average molecular weight (Mw) of Polymer B | — | 16600 |
| Number-average molecular weight (Mn) of Polymer B | — | 5500 |
| Weight of Polymer A | g | 44.29 |
| Weight of Polymer B | g | 0.70 |
| Physical properties of resin composition | | |
| Weight-average molecular weight (Mw) | — | 26500 |
| Number-average molecular weight (Mn) | — | 12200 |
| Molecular weight distribution (Mw/Mn) | — | 2.17 |
| Glass transition temperature (Tg) | °C. | 137.5 |
| Thickness of test piece for combustibility test | mm | 2 |
| Combustibility test (UL94) | — | V-0 |
| Flame burning time | sec | 5 |

The invention claimed is:

1. A polycarbonate resin comprising a structural unit (I) represented by formula (1) below:

(1)

wherein $L^1$ is a divalent linking group represented by any of formulas (i-1), (i-2) and (i-4) below, and
$L^2$ is a divalent linking group represented by any of formulas (ii-1), (ii-2) and (ii-4) below:

$$*\!\!-\!\!(\!\!-\!\!R^1\!\!-\!\!O\!\!-\!\!)_{\overline{p11}}\!(\!\!-\!\!R^2\!\!-\!\!)_{\overline{q11}}\!\!-\!\!* \quad \text{(i-1)}$$

$$*\!\!-\!\!(\!\!-\!\!R^1\!\!-\!\!O\!\!-\!\!)_{\overline{p11}}\!\!-\!\!* \quad \text{(i-2)}$$

$$*\!\!-\!\!(\!\!-\!\!R^1\!\!-\!\!O\!\!-\!\!)_{\overline{p11}}\!(\!\!-\!\!R^2\!\!-\!\!)_{\overline{q11}}\!\!-\!\!O\!\!-\!\!-\!\!* \quad \text{(i-4)}$$

$$*\!\!-\!\!(\!\!-\!\!R^2\!\!-\!\!)_{\overline{q21}}\!(\!\!-\!\!O\!\!-\!\!R^1\!\!-\!\!)_{\overline{p21}}\!\!-\!\!* \quad \text{(ii-1)}$$

$$*\!\!-\!\!(\!\!-\!\!O\!\!-\!\!R^1\!\!-\!\!)_{\overline{p21}}\!\!-\!\!* \quad \text{(ii-2)}$$

$$*\!\!-\!\!-\!\!O\!\!-\!\!(\!\!-\!\!R^2\!\!-\!\!)_{\overline{q21}}\!(\!\!-\!\!O\!\!-\!\!R^1\!\!-\!\!)_{\overline{p21}}\!\!-\!\!* \quad \text{(ii-4)}$$

wherein the symbol * represents a bonding position, $R^1$ and $R^2$ each independently represent an alkylene group having 1 to 20 carbon atoms, a cycloalkylene group having 3 to 20 ring-forming carbon atoms, an arylene group having 6 to 20 ring-forming carbon atoms, where one or more hydrogen atoms of these groups are optionally further replaced with substituents, and two of the substituents are optionally bonded to each other to form a ring structure, and 11, q11, p21, and q21 are each independently an integer of 1 to 10.

2. The polycarbonate resin according to claim 1, further comprising a structural unit (II) represented by formula (2) below:

$$\left[ \!-\!(OR^a)_{x1}\!-\!O\!-\!\!\underset{(R)_{n1}}{\bigcirc}\!\!-\!L^A\!-\!\!\underset{(R)_{n2}}{\bigcirc}\!\!-\!O\!-\!(R^bO)_{x2}\!-\!\overset{O}{\underset{\|}{C}}\!-\! \right] \quad (2)$$

wherein $R^a$ and $R^b$ each independently represent an alkylene group having 1 to 8 carbon atoms, Rs each independently represent an alkyl group having 1 to 8 carbon atoms or an aryl group having 6 to 12 ring-forming carbon atoms, x1 and x2 are each independently an integer of 0 to 10, n1 and n2 are each independently an integer of 0 to 4, and $L^A$ is a single bond or a linking group represented by any of formulas (a) to (g) below:

$$*\!\!-\!\!\overset{R^c}{\underset{R^d}{\overset{|}{\underset{|}{C}}}}\!\!-\!\!* \quad \text{(a)}$$

$$*\!\!-\!\!R^e\!\!\underset{\text{(fluorene)}}{\bigcirc}\!\!R^f\!\!-\!\!* \quad \text{(b)}$$

$$*\!\!-\!\!R^e\!\!\underset{\text{(cyclohexyl)}_m}{\bigcirc}\!\!R^f\!\!-\!\!* \quad \text{(c)}$$

$$*\!\!-\!\!R^e\!\!\underset{\text{(adamantyl)}}{\bigcirc}\!\!R^f\!\!-\!\!* \quad \text{(d)}$$

$$*\!\!-\!\!S\!\!-\!\!* \quad \text{(e)}$$

$$*\!\!-\!\!\overset{O}{\underset{\|}{S}}\!\!-\!\!* \quad \text{(f)}$$

$$*\!\!-\!\!\overset{O}{\underset{\underset{O}{\|}}{\overset{\|}{S}}}\!\!-\!\!* \quad \text{(g)}$$

wherein the symbol * represents a bonding position, $R^c$ and $R^d$ each independently represent a hydrogen atom, an alkyl group having 1 to 8 carbon atoms, or an aryl group having 6 to 12 carbon atoms, $R^e$ and $R^f$ each independently represent a single bond or an alkylene group having 1 to 4 carbon atoms, and m is an integer of 1 to 10.

3. The polycarbonate resin according to claim 2, having a content ratio [(I)/(II)] of the structural unit (I) to the structural unit (II) of 0.01/99.99 to 99.99/0.01 by molar ratio.

4. The polycarbonate resin according to claim 1, having a weight-average molecular weight (Mw) of 10,000 to 70,000.

5. The polycarbonate resin according to claim 1, having a glass transition temperature (Tg) of 100 to 160° C.

6. A polycarbonate resin composition comprising the polycarbonate resin according to claim 1.

7. The polycarbonate resin composition according to claim 6, being evaluated to be V-2 or higher in a combustibility test conducted on the polycarbonate resin composition according to the UL94 standard.

8. A formed article obtained by forming the polycarbonate resin composition according to claim 6.

9. A method for producing the polycarbonate resin according to claim 1, comprising:
carrying out a transesterification reaction.

* * * * *